(12) United States Patent
Revel-Muroz et al.

(10) Patent No.: US 10,648,610 B2
(45) Date of Patent: May 12, 2020

(54) METHOD OF THERMALLY INSULATING STOP VALVES, AND THERMAL-INSULATION DEVICE

(71) Applicants: Public Joint Stock Company "Transneft", Moscow (RU); Joint-Stock Company "Transneft Siberia", Tyumen (RU); L.L.C. "Transneft Research and Development Institute for Oil and Oil Products Transportation", Moscow (RU)

(72) Inventors: Pavel Aleksandrovich Revel-Muroz, Moscow (RU); Pavel Olegovich Revin, Aprelevka (RU); Vitaly Ivanovich Surikov, Balashikha (RU); Vyacheslav Vladimirovich Pavlov, Sankt-Peterburg (RU); Pavel Ivanovich Shoter, Moscow (RU); Anatoly Evgenevich Soshchenko, Moscow (RU)

(73) Assignees: PUBLIC JOINT STOCK COMPANY "TRANSNEFT", Moscow (RU); JOINT-STOCK COMPANY "TRANSNEFT SIBERIA", Tyumen (RU); L.L.C. "TRANSNEFT RESEARCH AND DEVELOPMENT INSTITUTE FOR OIL AND OIL PRODUCTS TRANSPORTATION", Moscow (RU)

( * ) Notice: Subject to any disclaimer, the term of this patent is extended or adjusted under 35 U.S.C. 154(b) by 710 days.

(21) Appl. No.: 15/227,939

(22) Filed: Aug. 3, 2016

(65) Prior Publication Data
US 2017/0023169 A1    Jan. 26, 2017

Related U.S. Application Data

(63) Continuation of application No. PCT/RU2014/000208, filed on Mar. 28, 2014.

(51) Int. Cl.
*F16L 59/16* (2006.01)

(52) U.S. Cl.
CPC .................. *F16L 59/161* (2013.01)

(58) Field of Classification Search
CPC ....... F16L 59/161; F16L 59/168; F16L 59/16; F16L 59/10; F16L 59/02; F16L 59/025; F16L 41/02; F16L 25/028; F16L 25/02
(Continued)

(56) References Cited

U.S. PATENT DOCUMENTS 1,755,899 A * 4/1930 Root .................. F16L 41/02
285/189
2,374,815 A * 5/1945 Haas, Jr. ............ F16L 41/02
138/161

(Continued)

FOREIGN PATENT DOCUMENTS

EP       0559066        9/1993
EP       2532515 A1 * 12/2012 ............... E04D 5/10
(Continued)

*Primary Examiner* — Tho V Duong
*Assistant Examiner* — Raheena R Malik
(74) *Attorney, Agent, or Firm* — One LLP; Jonathan Jaech

(57) ABSTRACT

A heat-insulated box for insulating parallel-slide valves includes multiple sections each including an outer protective steel envelope with a heat insulation coating on an inner surface. A number and configuration of sections is determined based on geometric parameters of the insulated valve. Some sections include two semi-cylindrical segments rigidly coupled together and oriented in mutually perpendicular directions such that one segment can be installed on the valve and one segment can be installed on the pipeline. The box also includes stiffeners at the junction of the two semi-cylindrical segments. The sections include shock-absorbing sealing gaskets made of cellular rubber substance to
(Continued)

ensure a tight seal of the box. The box includes a locking mechanism for coupling the sections together.

17 Claims, 3 Drawing Sheets

(58) Field of Classification Search
USPC .......................................................... 165/135
See application file for complete search history.

(56) References Cited

U.S. PATENT DOCUMENTS

| | | | | |
|---|---|---|---|---|
| 3,000,433 | A * | 9/1961 | Kemper | F16L 59/024 |
| | | | | 138/147 |
| 3,095,014 | A * | 6/1963 | Dosker | F16L 59/12 |
| | | | | 138/151 |
| 3,222,777 | A * | 12/1965 | Rutter | F16L 59/10 |
| | | | | 29/525.03 |
| 3,463,691 | A * | 8/1969 | Martin | F16L 59/16 |
| | | | | 156/294 |
| 3,559,694 | A * | 2/1971 | Volberg | F16L 59/16 |
| | | | | 138/147 |
| 3,724,491 | A | 4/1973 | Knudsen et al. | |
| 3,779,583 | A * | 12/1973 | Nuber | F16L 25/028 |
| | | | | 285/48 |
| 3,818,949 | A | 6/1974 | Johnson | |
| 3,889,715 | A * | 6/1975 | Lilja | F16L 59/025 |
| | | | | 138/117 |
| 4,162,093 | A | 7/1979 | Sigmund | |
| 4,207,918 | A * | 6/1980 | Burns | F16L 59/168 |
| | | | | 137/375 |
| 4,259,981 | A | 4/1981 | Busse | |
| 4,327,778 | A * | 5/1982 | Williams | F16L 59/22 |
| | | | | 138/149 |
| 4,363,681 | A * | 12/1982 | Williams | F16L 59/22 |
| | | | | 138/149 |
| 4,465,307 | A * | 8/1984 | de Lange | F16L 59/163 |
| | | | | 138/149 |
| 4,488,739 | A * | 12/1984 | de Lange | F16L 59/163 |
| | | | | 138/149 |
| 4,556,082 | A | 12/1985 | Riley et al. | |
| 4,696,324 | A | 9/1987 | Petronko | |
| 4,807,669 | A | 2/1989 | Prestidge, Sr. | |
| 5,814,825 | A | 9/1998 | Mussman | |
| 5,941,287 | A * | 8/1999 | Terito, Jr. | F16L 59/161 |
| | | | | 138/149 |
| 5,996,643 | A * | 12/1999 | Stonitsch | F16L 59/143 |
| | | | | 138/109 |
| 6,000,420 | A * | 12/1999 | Nicholson | F16L 59/16 |
| | | | | 137/15.01 |
| 6,035,795 | A | 3/2000 | Dhellemmes et al. | |
| 6,907,907 | B2 | 6/2005 | Maida | |
| 7,159,620 | B2 | 1/2007 | Kissell | |
| 7,947,354 | B2 | 5/2011 | Pirogovsky et al. | |
| 2002/0100517 | A1* | 8/2002 | Somerville | F16L 59/025 |
| | | | | 138/148 |
| 2007/0131300 | A1* | 6/2007 | Lounders | F16L 59/163 |
| | | | | 138/149 |
| 2007/0272320 | A1 | 11/2007 | Roberson | |
| 2008/0295896 | A1 | 12/2008 | Maida | |

FOREIGN PATENT DOCUMENTS

| | | |
|---|---|---|
| FR | 2489471 | 3/1982 |
| GB | 1074483 | 7/1967 |
| RU | 40433 | 9/2004 |
| RU | 119843 | 8/2012 |
| RU | 2516050 | 10/2013 |
| RU | 2517945 | 10/2013 |
| RU | 2530986 | 10/2014 |
| RU | 2575534 | 2/2016 |

* cited by examiner

METHOD OF THERMALLY INSULATING STOP VALVES, AND THERMAL-INSULATION DEVICE

CROSS-REFERENCE TO RELATED APPLICATIONS

This application claims the benefit and priority of PCT Pat. App. No. PCT/RU2014/000208, titled METHOD OF THERMALLY INSULATING STOP VALVES, AND THERMAL-INSULATION DEVICE and filed on Mar. 28, 2014, also published as WO/2015/147673.

FIELD

The invention relates to the construction of pipelines and, in particular, to heat insulation coverings of valves (flanges, gate valves, valves, etc.) of main and processed pre-insulated pipelines, the pipelines being for transportation of oil and oil products in adverse climatic conditions (such as relatively low temperatures).

BACKGROUND

Various heat insulation structures and methods for insulating stop valves (including parallel-slide valves) are known in the art.

For example, a "Heat Insulation Structure" (disclosed by RF patent No. RU40433, published on Sep. 10, 2004, IPC F16L59/00) discloses a temporary heat insulation structure that includes removable segments of coverings that are fastened together with bands. The segments are assembled in a structure that forms a heat insulation jacket around the pipeline and consists of multiple sectors that are diametrically bound together using a lock. The bands are made in the form of tightening belts fixed with a tightening device with a stopper.

However, this structure does not allow for quick removal of individual segments. Access to individual components of insulated equipment for maintenance and repair requires dismantling of the entire structure which is undesirable.

A parallel-slide valve insulation device (disclosed by RF patent No. RU119843, published on Aug. 27, 2012, IPC F16L59/00) discloses temporary structures having a protective envelope. The inner surface of the envelope has a non-flammable insulating material attached via mastic. This reference is the closest analogue of the technical solution disclosed herein. The joints between the temporary components of the structure are sealed with sealing gaskets, providing access to the parallel-slide valve for maintenance and repair. The parallel-slide valve insulation design may consist of two or more parts, and its shape (rectangular or shaped version) is determined by the shape and size of the parallel-slide valve, design features, a type of connection to the pipeline (welded or flanged), and the mounting method. The protective envelope is made of galvanized sheet steel. Insulation parts are fixed with metal ties with locks, bolts with nuts, and self-tapping screws. The design has a non-removable (factory mounted) portion at the bottom of the parallel-slide and a part consisting of temporary components (installed in the field). Glass foam is used as insulation material. Inside the protective envelope with insulation there are gas detectors and pipe branches for blowing out the internal cavity of the heat insulation before dismantling when the gas detectors detect a high content of oil vapors.

The disadvantage of this solution is that it is a relative complicated design of a parallel-slide valve heat insulation relative to the solution. In particular, this design requires greater labor input during its installation and during maintenance while the pipeline is operating. Also, this design is characterized by a highly fragile heat insulation layer due to lack of mechanical protection of the heat insulation layer that is made of glass foam.

SUMMARY

The object of the invention is to improve the design of heat insulation of valves (e.g., a heat-insulated box for a parallel-slide valve) for above ground pipelining in the field conditions, to provide the possibility of producing such insulation devices in a factory, to simplify assembly of such insulation devices in the field, and to provide access to valves during operation of the pipeline (including for maintenance and repair) while maintaining strength and heat transfer characteristics of the insulation device.

The technical result that can be obtained using this invention is a reduction of time spent for installation (assembly) of the valve heat insulation device and the ability to dismantle or remove individual blocks of the device to provide access to the components of the valves for maintenance and repair, while maintaining the high performance characteristics of the device. This is particularly important during installation, repair and technical work when the pipeline is installed in the Far North where the air temperatures reach minus 60 degrees Celsius (−60° C.).

The technical result is achieved due to the structural features of the entire applied valve heat insulation device, and of its individual blocks (sections). Access to the stop valves via easily-removable sections do not require full dismantling of the heat insulation.

The solution includes a device (heat-insulated box) for heat insulation of a parallel-slide valve on a pipeline. The device includes an external protective envelope made of galvanized steel with a heat insulation coating on an inner surface of the envelope. The heat insulation coating is built in sections, the number and configuration of which is determined based on the geometric parameters of the insulated valve. Some of the sections include two cylindrical or partially-cylindrical segments rigidly interconnected and oriented in mutually perpendicular directions. These sections are designed to be installed both on the valve and on the portion of the pipeline with original heat insulation adjacent to the valve. In that regard, one of the segments is installed on the valve and one of the segments is installed on the portion of the pipeline that is perpendicular to the valve. These sections are also equipped with stiffeners at the junction of the segments.

The sections of the valve insulating box have sealing shock-absorbing gaskets made of a cellular rubber substance to ensure a tight seal of the box during multiple assemblies and disassemblies. A locking mechanism is located on an outer surface of the envelopes of adjacent sections and is used to connect the sections. The heat insulation coating is made of glass foam blocks, mounted side by side with a profile that reproduces that of the parallel-slide valve when the relative segments are installed. The glass foam blocks are mounted on the inner surface of the protective envelope and to each other using a bitumen-based adhesive. The surface of the glass foam blocks, where they contact the parallel-slide valve, are coated to protect the glass foam blocks from abrasion.

In a particular embodiment, eight (8) sections may be installed on each of the valve portion and on the pipeline portion having an original heat insulation adjacent to the valve. Each of the sections in such an embodiment represents a quarter of a cylinder. The protective envelope on the segments that will be placed on the pipeline is made of galvanized steel with pre-notched and curved edges for rigid mounting of the sections with self-tapping screws. Notches to connect the sections that will be placed on the pipeline to sections that will be placed on the valve are 5 to 10 centimeters (cm) in depth.

In a particular embodiment, the stiffener is a metal plate, e.g. triangular, one edge of which is welded perpendicular to a surface of a segment of a section to be placed on the pipeline, and a second edge is welded perpendicular to a surface of a segment of a section to be placed on the valve. These stiffeners may be installed at a distance of at least 20 cm from each other.

K-flex and Armaflex foam rubber gaskets may be used as shock-absorbing sealing gaskets. Bitumen TechnoNikol may be used a bitumen-based adhesive to fix glass foam (cellular glass) blocks together and to the inner surface of the envelope. A composition comprising non-combustible cement with fiberglass reinforcement is used to protect glass foam blocks from abrasion from the valve. The foam glass may have a thickness of at least 100 mm. The outer envelope made of galvanized steel is between 0.8 and 1 millimeter (mm) thick. The sections have at least one handle for ease of assembly/disassembly.

A method for manufacturing the heat-insulated box to provide heat insulation of the parallel-slide valve located on a pipeline includes calculating a number of sections required for the valve heat insulation. The method also includes manufacturing a protective envelope of galvanized steel for each section, followed by fixation (gluing) of glass foam blocks (sections or segments) with a bitumen-based adhesive on the inner surface of the envelope to form the insulating coating. The method also includes applying a coating on the inner surface of glass foam blocks (segments) to protect the glass foam blocks from abrasion. After that, sealing gaskets made of a cellular rubber substance are glued to the side ends along a perimeter of the assembled section to ensure tightness of the structure during and after multiple assemblies and disassemblies of the box. The protective envelope of galvanized steel for some of the sections is made of two cylindrical segments oriented in mutually perpendicular directions and adapted to be installed both on the valve and on the part of the pipeline with original heat insulation adjacent to the valve. These segments are rigidly interconnected and have stiffeners installed at the point of connection.

The applied method has also the features listed in the description of the device, which can also be used in the method of making the box.

BRIEF DESCRIPTION OF THE DRAWINGS

The invention is illustrated by the following drawings, where.

DETAILED DESCRIPTION

The drawings illustrate the following features and corresponding reference numbers:
1. Parallel-slide valve.
2. Main pipe branches of the valve.
3. Protective envelope of the heat-insulated box.
4. Heat insulation coating of the heat-insulated box.
5. Sections of the heat-insulated box (or of the protective envelope with heat insulation coating on the inner surface of the envelope).
6. The upper layer of the heat insulation (of sections).
7. The lower layer of the heat insulation (of sections).
8. The middle layer of the heat insulation (of sections).
9. Side wall of the heat-insulated box.
10. The end wall of the heat-insulated housing.
11. A segment of the section of the upper/lower layer, which is part of the side wall of the heat-insulated housing.
12 A segment of the section of the upper/lower layer, which is part of the end wall of the heat-insulated housing.
13. A segment of the section of the middle layer, which is a part of the side wall of the heat-insulated housing (to be placed on the parallel-slide valve).
14. A segment of the section of the middle layer, used to be placed on the pipeline.
15. Stiffener.
16. Blocks (segments) made of foam glass.
17. Sealing shock-absorbing gaskets made of cellular rubber substance.
18. A locking mechanism.
19. A rigid coupling of the segments of the section of the middle layer protective envelope.
20. Fastening elements.
21. Handle.

Definitions

Stop valves are valves designed to shut off a flow of a medium in a pipeline.

Valves are industrial pipe fittings and a means in which a shut-off device moves back and forth, perpendicular to the axis of medium flow.

Parallel-slide valves are parallel valves in which a locking element is made in the form of a gate.

Anticorrosion protection includes any of a set of steps or elements that includes preparation of a steel surface to be covered with anticorrosive coating, application and curing of paints, quality control, etc.

Anticorrosive coating means a system of consistently applied and adhesively bonded layers of paint and varnish materials.

Glass foam (cellular glass) is an insulation material composed entirely of inorganic substances without a binder, having a foam structure produced by sintering finely ground glass powder and a gas-foaming agent.

Figure 1:
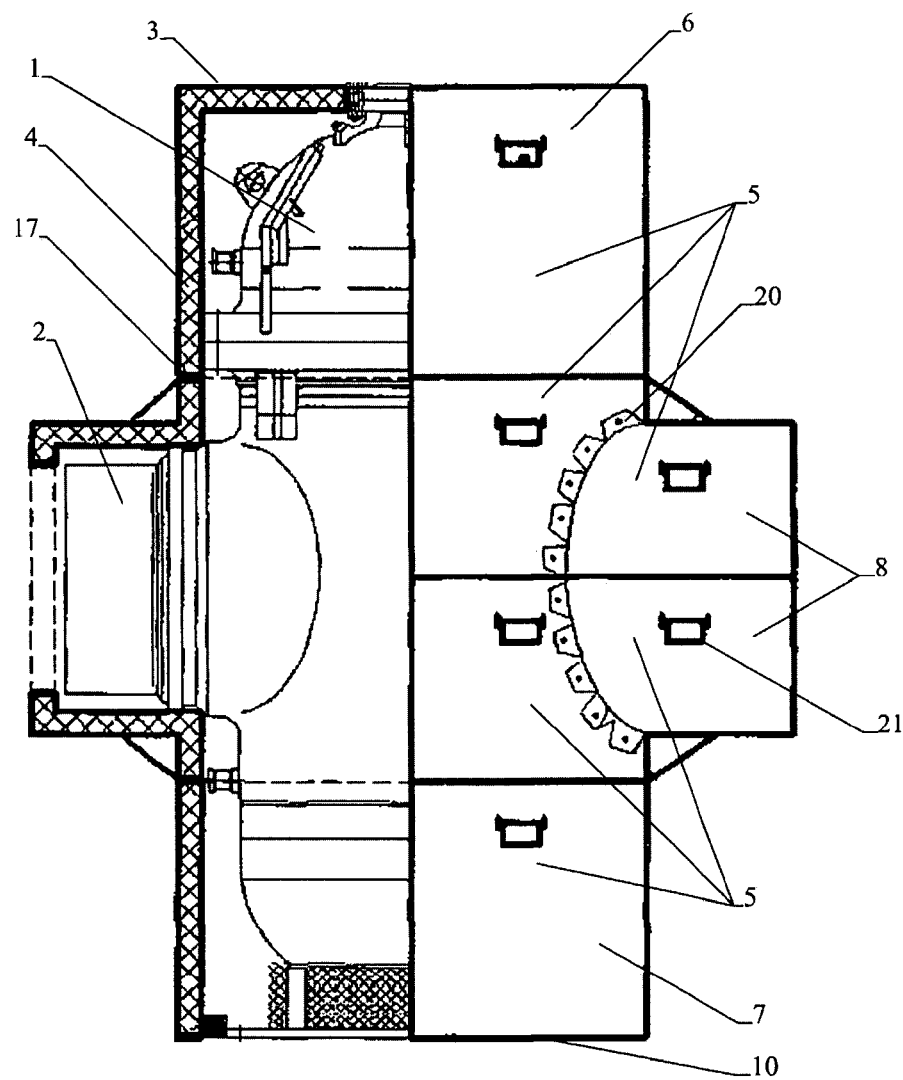
FIG. 1 illustrates an embodiment of a heat-insulated box for heat insulation of a parallel-slide valve.
Figure 6:
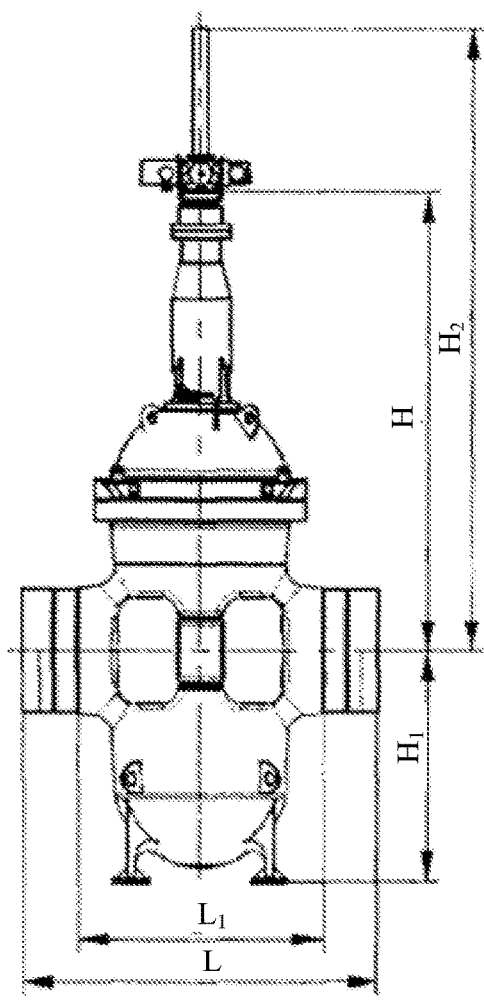
FIG. 6 illustrates an example of a parallel-slide valve design, where parameters L, $L_1$, H, $H_1$, $H_2$ correspond to dimensions of the parallel-slide valve.

A heat insulation box of a parallel-slide valve 1 is configured as a heat-insulated box and includes a protective envelope 3 made of galvanized steel (metal casing) with insulation coating 4 on the inner surface of the envelope. The box is provided in sections, the number and configuration of which is selected based on numerous factors, such as the geometric dimensions of valves, design features, a type of connection of the valve to the pipeline (welded or flanged), and an installation method (on the foundation, without a foundation). Further, the invention is exemplified by an arrangement of heat insulation located on the pipeline of the parallel-slide valve 1 as shown in FIGS. 1 and 6).

The parallel-slide valve 1 may have different dimensions. Table 1 below shows exemplary parameters of the valve to illustrate an embodiment of the invention. In table 1, L is a construction length of the valve, $L_1$ is a construction length of the valve excluding pipe branches, H is a distance from the axis of the pipeline to the flanges of the valve actuator, $H_1$ is a distance from the axis of the pipeline to the supporting surface of the valve, $H_2$ is a distance from the axis of the pipeline to the top of the spindle overhang, DN is a nominal diameter of the valve, and PN is a nominal pressure.

TABLE 1

| DN | PN, MPa | H | $H_1$ | $H_2$ | $L_1$ | L |
|---|---|---|---|---|---|---|
| | | | | Dimensions, mm | | |
| 1,000 | 2.5 | 3,856 | 2,216 | 5,256 | 2,070 | 3,000 |
| | 4.0 | | | | | |
| | 6.3 | | | | | |
| | 8.0 | | | | | |
| | 10.0 | | | | | |
| | 12.5 | | | | | |

Figure 4:
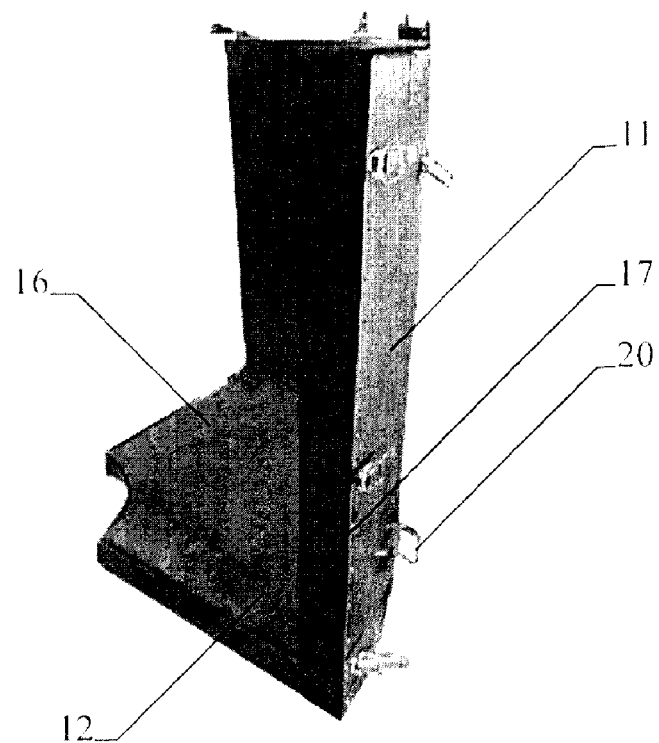
FIG. 4 illustrates an embodiment of a removable section of an upper/lower layer of a heat-insulated box.

In particular, for heat insulation of the parallel-slide valve 1 (see FIG. 6), the heat-insulated box (shown as assembled in FIGS. 1 and 4) has a cylindrical part oriented vertically (its height and nominal diameter adapted to fit the valve), which is intended for heat insulation of the valve 1 itself. The heat-insulated box also includes a cylindrical part adjacent to the vertical cylindrical part (having a nominal diameter of 1,000 mm) that is oriented horizontally and used for heat insulation of the main pipe branches 2 of the valve 1, and placed on opposite sides of the vertical part.

The embodiment of the heat-insulated box that is optimal for this parallel-slide valve design includes sixteen removable sections 5. Eight of the removable sections 5 are intended to be installed on the upper and the lower part of the parallel-slide valve (four sections 5 on the upper part of the valve 1 and four sections 5 on the lower part of the valve 1). These 8 sections form a lower 7 and an upper 6 layer of heat insulation. The remaining eight sections 5 are to be place on the central part of the parallel-slide valve to form a middle layer 8 of heat insulation.

Sections 5 used for the upper 6 and the lower 7 layers are made of two rigidly interconnected segments 11 and 12. The segment 11 is a part of a side wall 9 of the heat-insulated box and shaped as a quarter of a cylinder. The segment 12 is connected (coupled) to the circumference of the first segment 11 and forms a part of the end wall 10 of the heat-insulated box. The segment 12 is shaped as an angular segment with a one or more recess for projected parts of the parallel-slide valve 1 (see FIG. 4).

Figure 3:
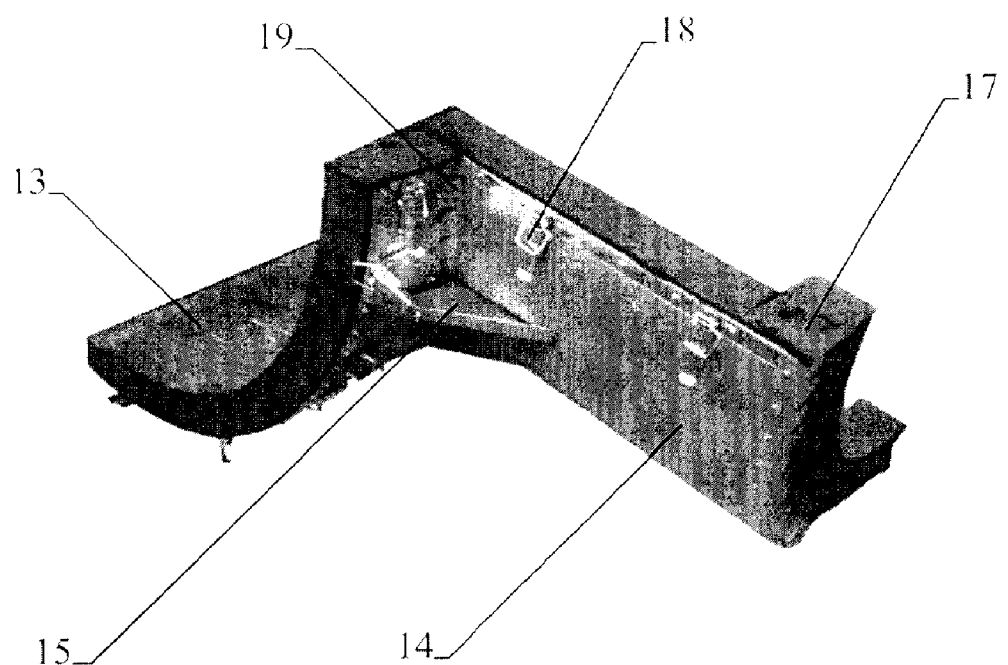
FIG. 3 illustrates an embodiment of a removable section of a middle layer of a heat-insulated box.
Figure 5:
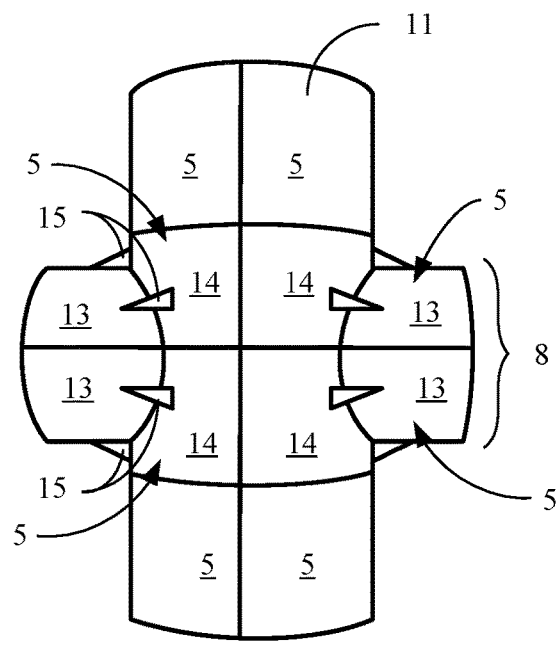
FIG. 5 illustrates an assembled heat-insulated box.

The middle layer 8 is made of eight sections 5, arranged in two rows (see FIG. 5). Sections 5 of the middle layer 8 are made of two rigidly interconnected segments 13 and 14, one or both of which represents a quarter of a cylinder (see FIG. 3). The segments 13 and 14 are oriented in mutually perpendicular directions, which allows for their installation both on the valve (segment 13) and on the portion of the pipeline (segment 14) with original insulation adjacent to the valve. Thus, one segment 13 is a part of sidewall of the heat-insulated box (i.e., intended to be placed on the valve), and the second segment 14 is to be placed on the pipeline with original heat insulation (including the main pipe branches 2).

Sections 5 of the middle layer 8 are equipped with stiffeners 15, installed at the point of coupling (connection) of the section segments 13, 14. In a particular embodiment the stiffener 15 is a triangular metal plate, one edge of which is welded perpendicularly to the surface of the section segment 14 (which is to be placed on the pipeline) and the second edge is welded perpendicularly to the surface of the section segment 13 (which is to be placed on the valve 1). The stiffeners 15 are mounted at a distance of at least 20 cm from each other.

The heat insulation 4 is made of glass foam (cellular glass) blocks (segments) 16 mounted adjacent to one another and having a shape similar to the shape of the valve surface at the installation site of the respective segments. The foam glass blocks 16 are attached to the inner surface of the protective envelope 3 and to each other with a bitumen-based adhesive, such as TechnoNikol. For heat insulation 4 of the box for use as heat insulation of a parallel-slide valve mounted on a pipeline in the Far North (with air temperatures down to minus 60° C.), it is recommended to use glass foam having specifications similar to those shown in Table 2.

TABLE 2

| Glass foam specifications | |
|---|---|
| Parameter | Value |
| Density, kg/m3 | 110-180 |
| Compressive strength at 10% strain, MPa, min | 0.70 |
| Thermal conductivity at 25° C., W/(m · K), max. | 0.05 |
| Water absorption for 24 hours, % by volume, max | 2.5 |
| Flammability group | nonflammable |

The thickness of the heat insulation 4 (the thickness of the glass foam blocks) is determined using a thermal calculation performed individually for each construction site.

The surface of glass foam blocks that are in contact with the parallel-slide valve 1 are covered with a protective coating that is based on nonflammable gypsum cement to protect the glass foam from mechanical impacts.

Figure 2:
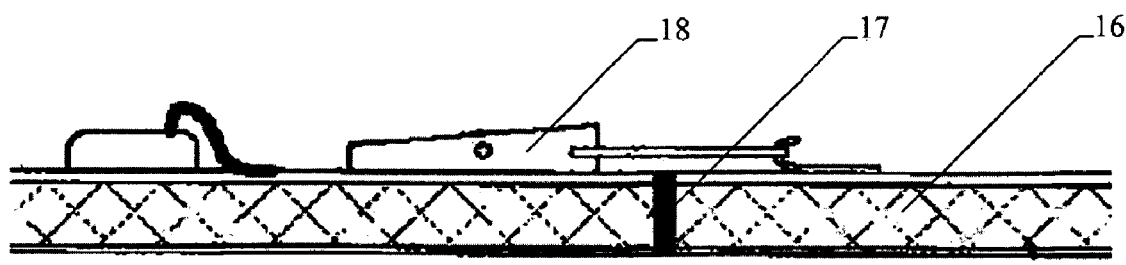
FIG. 2 illustrates a version of fastening adjacent sections of a heat-insulated box.

The sections 5 are equipped with sealing shock gaskets 17 made of a cellular rubber substance to ensure tightness of the box (i.e., a tight seal between sections 5) after multiple assemblies and disassemblies of the box. The sections 5 are also equipped with locking mechanism elements 18 disposed on the outer surface of the envelopes 3 of the adjacent sections. In particular, the locking mechanism 18 can be configured as metal tension buckles with locks, where the metal tension buckle is installed on one section, and the tension buckle's lock is installed in an adjacent section (see FIG. 2).

The box (such as all sections 5) is manufactured in a factory. The manufactured sections 5 to be mounted on the parallel-slide valve are installed in situ (in the field) (see FIG. 5). The protective envelope 3 is made of galvanized sheet steel having a thickness of 1.0 mm, which protects the heat insulation from environmental impacts and mechanical damage during installation and operation.

The use of the proposed heat-insulated box ensures heat insulation of the parallel-slide valve using fireproof materials and provides access for maintenance and repair of the valve.

A method for manufacturing of the heat-insulated box for providing heat insulation of a parallel-slide valve mounted on the pipeline includes the following steps. First, a number of sections 5 required for insulation of the valve 1 should be calculated (including shapes and dimensions of the sections). Glass foam blocks 4 are manufactured for each section, and the profile of the blocks should reproduce that of the valve 1 at the place of installation of the section 5 on the valve 1. An outer protective envelope 3 for each section 5 is made of galvanized sheet metal, which is delineated according to the dimensions of the sections (such as the glass foam blocks assembled for each section). The envelope 3 is bent on a steel bender and then attached to blocks (segments) of the section using a bitumen-based adhesive. After that, the inner surface of the glass foam blocks (segments), where they are in contact with the surface of the parallel-slide valve 1, are coated to protect them from abrasion. Sealing gaskets made of cellular rubber substance, e.g. K-Flex or Armaflex, are attached on the end sides of the sections 5 along the entire perimeter to ensure tightness of the structural seals after multiple assemblies and disassemblies of the box.

Heat insulation of the parallel-slide valve mounted on the pipeline includes assembling the sections 5 of the heat-insulated box (as described above) and securing sections using metal locks.

The invention claimed is:

1. A heat-insulated box for providing heat insulation of a parallel-slide valve installed perpendicularly to a pipeline, the heat-insulated box comprising:
  a plurality of sections of glass foam heat insulation comprising at least four combination pieces configured for covering a portion of the valve perpendicular to the pipeline and a semi-cylindrical portion of the pipeline adjacent to the valve, each of the at least four combination pieces comprising two rigidly interconnected quarter-cylindrical segments that are oriented perpendicular relative to each other such that one of the rigidly interconnected quarter-cylindrical segments is configured to be installed on the parallel-slide valve and the other of the rigidly interconnected quarter-cylindrical segments is configured to be installed on the pipeline;
  sealing gaskets of a cellular rubber substance positioned at edges of each of the plurality of sections to provide a seal between each of the plurality of sections;
  a plurality of metallic outer protective envelopes each having an inner surface adhered to a corresponding one of the plurality of sections; and
  latches coupled to at least some of the plurality of outer protective envelopes and configured to couple adjacent ones of the plurality of sections together.

2. The heat-insulated box of claim 1, wherein the plurality of sections of the glass foam heat insulation further comprise an additional four composite sections each comprising the two rigidly interconnected quarter-cylindrical segments that are oriented perpendicular relative to each other.

3. The heat-insulated box of claim 1, wherein the plurality of sections of the glass foam heat insulation are coupled together and to the plurality of outer protective envelopes using a bitumen-based adhesive.

4. The heat-insulated box of claim 1, wherein at least some of the plurality of sections of the glass foam heat insulation include glass foam blocks having a profile that matches that of the parallel-slide valve.

5. The heat-insulated box of claim 1, wherein each of the plurality of metallic outer protective envelopes is made of galvanized steel having a thickness that is between 0.8 millimeters (mm) and 1 mm.

6. The heat-insulated box of claim 1, wherein at least some of the plurality of sections are equipped with a handle for ease of disassembly of the heat-insulated box.

7. The heat-insulated box of claim 1, wherein an inner surface of at least some of the plurality of sections of the glass foam heat insulation is coated with a coating based on nonflammable gypsum cement to protect from mechanical impact.

8. The heat-insulated box of claim 1, wherein TechnoNikol bitumen is used as a bitumen-based adhesive to fix the plurality of sections of the glass foam heat insulation to each other and to the inner surface of each of the plurality of outer protective envelopes.

9. The heat-insulated box of claim 1, wherein a composition comprising nonflammable cement with fiberglass reinforcement is used to protect an inner surface of at least some of the plurality of sections of the glass foam heat insulation from abrasion.

10. The heat-insulated box of claim 1, wherein the plurality of sections of the glass foam heat insulation comprise glass foam blocks having a minimum thickness of 100 mm.

11. The heat-insulated box of claim 1, wherein each of the at least four composite pieces further comprises at least one stiffener coupled to each of the two rigidly interconnected quarter-cylindrical segments to provide rigidity therebetween.

12. The heat-insulated box of claim 11 further comprising at least one stiffener comprising a metal triangular plate having a first edge coupled to one of the two rigidly interconnected quarter-cylindrical segments and a second edge coupled to another of the two rigidly interconnected quarter-cylindrical segments.

13. The heat-insulated box of claim 12, wherein each metal triangular plate is installed at a distance of at least 20 centimeters from each adjacent metal triangular plate.

14. The heat-insulated box of claim 1, wherein the plurality of sections of the glass foam heat insulation comprise a nonflammable glass foam material having a density in a range of 110-180 kg/m$^3$.

15. The heat-insulated box of claim 14, wherein the nonflammable glass foam material has a maximum thermal conductivity at 25° C. of 0.05 W/(m·K).

16. The heat-insulated box of claim 14, wherein the nonflammable glass foam material has a maximum water absorption for 24 hours of 2.5% by volume.

17. The heat-insulated box of claim 14, wherein the nonflammable glass foam material has a minimum compressive strength at 10% strain of 0.70 MPa.

* * * * *